United States Patent
Hibino et al.

[11] Patent Number: 6,151,917
[45] Date of Patent: Nov. 28, 2000

[54] PRESS-MOLDING DIE FOR MAGNETIC-DISK GLASS SUBSTRATE

[75] Inventors: Kunio Hibino; Makoto Umetani; Hidenao Kataoka, all of Osaka, Japan

[73] Assignee: Matsushita Electric Industrial Co., Ltd., Osaka, Japan

[21] Appl. No.: 09/127,165

[22] Filed: Jul. 31, 1998

[30] Foreign Application Priority Data

Aug. 7, 1997 [JP] Japan ..................... 9-213494

[51] Int. Cl.$^7$ ................................. C03B 40/00
[52] U.S. Cl. .................. 65/169; 65/374.11; 425/406
[58] Field of Search ................... 65/169, 374.11; 425/406

[56] References Cited

U.S. PATENT DOCUMENTS

| | | | |
|---|---|---|---|
| 4,685,948 | 8/1987 | Kuribayashi et al. | 65/26 |
| 4,721,518 | 1/1988 | Monji et al. | 65/374.11 |
| 4,953,385 | 9/1990 | Aoki et al. | 72/462 |
| 5,125,945 | 6/1992 | Menihan et al. | 65/66 |
| 5,125,949 | 6/1992 | Hirota et al. | 65/374.13 |
| 5,147,436 | 9/1992 | Blakeslee et al. | 65/33 |
| 5,171,348 | 12/1992 | Umetani et al. | 65/374.11 |
| 5,567,484 | 10/1996 | Baumgart et al. | 427/555 |
| 5,595,791 | 1/1997 | Baumgart et al. | 427/554 |
| 5,770,294 | 6/1998 | Sakamoto | 428/64.1 |

FOREIGN PATENT DOCUMENTS

| | | |
|---|---|---|
| 63-152022 | 6/1988 | Japan . |
| 63-167422 | 7/1988 | Japan . |
| 1-302530 | 12/1989 | Japan . |
| 4-95219 | 3/1992 | Japan . |
| 4-167226 | 6/1992 | Japan . |

*Primary Examiner*—Sean Vincent
*Attorney, Agent, or Firm*—Merchant & Gould P.C.

[57] ABSTRACT

A press-molding die can manufacture magnetic disks suitable for the zone-texture technique in large quantities and at a low price by forming smooth surface areas and rough surface areas on the surface of the press-molding die. A manufacturing method for this press-molding die is provided. A magnetic-disk glass substrate that has improved CSS properties and allows a lower flying height is formed using this press-molding die. An intermediate layer is formed by sputtering on a die base material. A mask having an aperture is formed on the intermediate layer. The surface of the intermediate layer is roughened by etching in the aperture. A first protective layer is formed by sputtering in the etched portion. After the mask has been removed, a second protective layer is formed on the intermediate layer by sputtering. The surface roughness of the rough surface portion is reflected by the surface roughness of the first protective layer. The surface roughness if the first protective layer is reflected by the surface roughness of the second protective layer. Thus, a rough surface portion can be formed on the second protective layer.

28 Claims, 5 Drawing Sheets

PRESS-MOLDING DIE FOR MAGNETIC-DISK GLASS SUBSTRATE

FIELD OF THE INVENTION

The present invention relates to a press-molding die for producing a magnetic-disk glass substrate suitable for a zone-textured magnetic disk, a manufacturing method for the press-molding die, and a magnetic-disk glass substrate manufactured using the press-molding die.

BACKGROUND OF THE INVENTION

Since computers came into wide-spread use in recent years, the need for higher performance, such as miniaturization and higher capacity of hard-disks, which are one type of external storage devices, has become very high. There has been much research on lower-flying magnetic heads, for which extremely high precision of the smoothness of the magnetic disk is required.

Conventionally, aluminum alloys mainly have been used as the substrate material for magnetic disks. However, aluminum alloy substrates have a low hardness, so that their surface deforms plastically when polished, even when polishing them precisely with high-precision abrasive and polishing machinery. Therefore, it was difficult to obtain smooth surfaces with high precision. Also, forming a nickel-phosphor layer with higher hardness on the substrate surface has proven insufficient to respond to the need for smooth surfaces with high precision.

In the drive for miniaturization, disk thickness close to those of thin films are required. However, it has proven difficult to respond to this need with aluminum alloy substrates of low strength.

The recent adoption of high-sensitivity magnetoresistant heads (MR heads) has led to the need for noise reduction in the magnetic disk, and a magnetic film on the substrate has been demanded. However, it is also becoming difficult to respond to this need with aluminum alloy substrates.

Therefore, new materials such as glass, ceramics and carbon have been suggested for magnetic-disk substrates. Of these materials, glass substrates have been studied in detail and have reached practical use already. Glass substrates have high strength, good heat resistance, and high surface hardness, and can satisfy the need for very precise smoothness by being precision-polished with high accuracy.

In magnetic disks with high surface smoothness, the flying height of the magnetic head can be reduced, but on the other hand the so-called "head-stick" problem occurs. This means, in a hard-disk drive employing the contact-start-stop (CSS) method, the magnetic head and the magnetic disk come in sliding contact when the device is started or stopped. Because the rotation is started or stopped in this situation, a friction force arises between the magnetic head and the magnetic disk, and the surfaces of the magnetic head and the magnetic disk are abraded, which becomes a reason for the deterioration of the magnetic conversion properties.

Especially when water adheres to the magnetic disk, water enters the space between the magnetic head and the magnetic disk and leads to agglutination. When the hard-disk is started in this situation, a large resistance occurs between the magnetic head and the magnetic disk, which sometimes leads to damage or destruction of the magnetic disk, so the head-stick phenomenon is a serious problem.

To achieve both a lower-flying magnetic head and prevent adhesion, there have been attempts to reduce the surface roughness as much as possible. However, this method reached a limit as to how low the magnetic head can float. As another method to achieve both goals, a so-called zone-texture technique has been suggested, with a CSS zone, where the magnetic head takes off and lands on the disk surface (for example, a doughnut-shaped region near the inner circumference of the disk), whose surface is kept rough enough so that magnetic head/disk adhesion and damage can be prevented, and a data zone where the surface roughness is smaller than in the CSS zone, so that a lower-flying head can be realized.

Conventionally, to obtain magnetic-disk glass substrates with a smooth surface, glass substrates were cut into predetermined sizes and precision-polished one by one. Publications of Unexamined Japanese Patent Application (Tokkai) No. Sho 63-152022 and Sho 63-167422 disclose a method for partially changing the degree of the polishing step and a method for partially etching, as methods for partially forming irregularities in the surface of the magnetic disk substrate. Moreover, a method for surface processing using a laser has been disclosed recently in Publication of Unexamined Japanese Patent Application (Tokkai) No. Hei 7-182655. This method is beginning to be researched widely as a method with good controllability.

Press-molding has been researched widely in the field of manufacturing optical glass elements and there have been efforts to put it into practical use as a manufacturing method with high product quality and high productivity.

A special die is necessary for press-molding, that is, a die that does not deteriorate when molding glass repeatedly under high temperature and high pressure, and several types of molds have been researched.

Super-hard alloys (tungsten carbide), cermet, zirconia, silicon carbide and ceramics are used for the press-molding die base material. Molds have been developed that are coated with a protective film with good releasability, oxidation resistance, and reaction resistance, in order to protect the die base material and prevent sticking of the glass at die release.

For example, Publication of Unexamined Japanese Patent Application (Tokkai) No. Hei 2-137914 suggests a casting mold, comprising a noble metal alloy thin film on a super-hard alloy surface, where a fine pattern is formed on the alloy surface.

However, conventional manufacturing methods for magnetic disk substrates as described above lead to the following problems:

(1) When precision-polishing the glass substrates one by one, there is the problem that high precision is required in the polishing step, and that the number of steps is large.

(2) When partially changing the degree of the polishing step or partially etching, there is a limit as to how precise the surface properties can be controlled while maintaining good productivity.

(3) Using a laser to process the surface requires costly machinery, so that the problem of higher manufacturing costs arises.

(4) In the press-molding method, there is the problem that the processability of the super-hard alloy (tungsten carbide) or the cermet used for the die base material is low, and that it is difficult to obtain a sufficient smoothness (of nm order) for the magnetic-disk substrate mold.

It is a purpose of the present invention to provide a press-molding die and a magnetic-disk glass substrate to solve these problems. It is a further purpose of the present invention to provide a press-molding die that can manufacture magnetic disks that are suitable for the zone-texture technique in large quantities and at a low price by forming smooth surface areas and rough surface areas on the surface of the press-molding die. It is a further purpose of the present invention to provide a manufacturing method for this press-molding die. It is a further purpose of the present invention to provide a magnetic-disk glass substrate, formed using this press-molding die, that has improved CSS properties and allows a lower flying height.

SUMMARY OF THE INVENTION

In order to achieve these purposes, a press-molding die for a magnetic-disk glass substrate according to the present invention has a plurality of regions with differing surface roughness on a press-molding face. A plurality of regions with differing surface roughness can be formed on a magnetic-disk substrate molded using such a press-molding die. Thus, magnetic-disk glass substrates can be manufactured that have improved CSS properties and allow lower flying height.

It is preferable that the plurality of regions with differing surface roughness comprises an outer region comprising a peripheral portion of the press-molding face and an inner region comprising a central portion of the press-molding face within the outer region. Two types of regions with differing surface roughness can be formed on a magnetic-disk substrate molded using such a press-molding die. Thus, one of those can be used as a CSS zone for taking off and landing the magnetic head on the magnetic disk, and the other one can be used as a data zone.

It is preferable that the press-molding face has a smooth surface region with a center line average roughness (Ra) of less than 2 nm and a rough surface region with a center line average roughness (Ra) of 2 to 50 nm. A smooth surface region and a rough surface region can be formed on a magnetic-disk substrate molded using such a press-molding die. Thus, the rough surface region can be used as a CSS zone for taking off and landing the magnetic head from the magnetic substrate, and the smooth surface region can be used as a data zone.

It is preferable that the press-molding die comprises a die base material having a press-molding face side; at least one protective layer above the press-molding face side of the die base material; and at least one intermediate layer between the protective layer and the press-molding face side of the die base material, wherein a surface of the protective layer is an outermost surface of the press-molding die, and the outermost surface of the press-molding die comprises the press-molding face. In such a press-molding die, the protective layer is formed on the intermediate layer, which increases the bond strength of the protective layer.

It is preferable that in the preferable press-molding die, where the protective layer is formed on the intermediate layer, the at least one protective layer comprises a first protective layer and a second protective layer, a surface of the press-molding face side of the die base material is smooth, the first protective layer is formed on the intermediate layer, a rough surface region is formed on a surface of the first protective layer, and the second protective layer is formed on the rough surface region. In such a press-molding die, the surface roughness of the rough surface region formed on the first protective layer is reflected by the surface roughness of the second protective layer formed thereon. Thus, a rough surface region can be formed in the outermost surface of the protective layers, which comprises the press-molding face.

It is preferable that a surface of the press-molding face side of the die base material is smooth, and a rough surface region is formed on a surface of the at least one intermediate layer. In such a press-molding die, the surface roughness of the rough surface region formed on the intermediate layer is reflected by the surface roughness of the protective layer formed thereon. Thus, a rough surface region can be formed in the outermost surface of the protective layer, which comprises the press-molding face.

It is preferable that in the preferable press-molding die, where the rough surface region is formed on the intermediate layer, the at least one protective layer comprises a first protective layer and a second protective layer, the first protective layer is formed on the rough surface region, and the second protective layer is formed on the intermediate layer, on which the rough surface region has been formed, and the first protective layer. In such a press-molding die, the surface roughness of the rough surface region formed on the intermediate layer is reflected by the surface roughness of the first protective layer and the second protective layer formed thereon. Thus, a rough surface region can be formed in the outermost surface of the protective layer, which comprises the press-molding face.

It is preferable that the at least one intermediate layer comprises a first intermediate layer and a second intermediate layer, the first intermediate layer is formed on the surface of the press-molding face side of the die base material, the rough surface region is formed on a surface of the first intermediate layer, the second intermediate layer is formed on the rough surface region, and the at least one protective layer is formed on the first intermediate layer and the second intermediate layer. In such a press-molding die, the surface roughness of the rough surface region on the first intermediate layer is reflected by the surface roughness of the second intermediate layer and the protective layer formed thereon. Thus, a rough surface region can be formed in the outermost surface of the protective layer, which comprises the press-molding face.

It is preferable that in the preferable press-molding die, where the protective layer is formed on the intermediate layer, a rough surface region is formed on the surface of the press-molding face side of the die base material. In such a press-molding die, the surface roughness of the press-molding face side of the die base material is reflected by the surface roughness of the intermediate layer and the protective layer formed thereon. Thus, a rough surface region can be formed in the outermost surface of the protective layer, which comprises the press-molding face.

It is preferable that in the preferable press-molding die, where the rough surface region is formed on the die base material, the rough surface region is formed on a surface of a layer that is formed separately from the die base material. In such a press-molding die, a rough surface region can be formed on the surface of the press-molding face side of the die base material by forming a separate layer, even when a rough surface region cannot be formed directly on the die base material.

It is preferable that the at least one intermediate layer comprises a first intermediate layer and a second intermediate layer, the rough surface region is formed on a surface of the first intermediate layer formed on the die base material, the second intermediate layer is formed on a surface of the press-molding face side of the first intermediate layer and the die base material, and the at least one protective layer is formed on the second intermediate layer. In such a press-molding die, the surface roughness of the first intermediate layer on the surface of the press-molding face side of the die base material is reflected by the surface roughness of the second intermediate layer and the protective layer formed thereon. Thus, a rough surface region can be formed in the outermost surface of the protective layer, which comprises the press-molding face.

It is preferable that the material for the die base material is a glass material having silicon dioxide as a main component and comprising at least one material selected from the group consisting of aluminum oxide, magnesium oxide, zinc oxide, alkali metal oxide, and alkali earth metal oxide. When such a material is selected for the press-molding die, a surface roughness that is sufficient for magnetic disk substrates can be attained. Moreover, the mechanical strength at high temperatures is very high, so that deterioration of the die can be prevented even when it is used repeatedly over a long period of time, and the lifetime of the expensive die can be extended, and zone-textured high-quality magnetic-disk glass substrates combining high density with high reliability can be provided at low cost in large quantities.

It is preferable that the glass material is quartz glass. With quartz glass, a surface roughness that is sufficient for magnetic disk substrates can be attained, because the glass transition temperature of quartz glass is high, its mechanical strength at high temperatures is very high, and its thermal expansion coefficient is small, so that it is suitable as a die base material.

It is also preferable that the material for the die base material is single-crystal alumina. With single-crystal alumina, a surface roughness that is sufficient for magnetic disk substrates can be attained, because single-crystal alumina, as glass or quartz glass, can prevent deterioration of the mold, even when it is used repeatedly over a long period of time.

It is preferable that the intermediate layer comprises at least one material selected from the group consisting of silicon carbonate, silicon nitride, and silicon oxide, and a component included in the protective layer formed on the intermediate layer. When such a material is selected for the intermediate layer, exfoliation of the protective layer formed on the intermediate layer can be prevented, even when the die is used repeatedly under high temperatures and high pressures over a long period of time.

It is preferable that the intermediate layer comprises at least one metal selected from the group consisting of titanium (Ti), vanadium (V), chrome (Cr), zirconium (Zr), niobium (Nb), molybdenum (Mo), hafnium (Hf), tantalum (Ta) and tungsten (W). When such a material is selected for the intermediate layer, exfoliation of the protective layer formed on the intermediate layer can be prevented, even when the die is used repeatedly under high temperatures and high pressures over a long period of time.

It is preferable that the protective layer comprises at least one metal selected from the group consisting of tungsten (W), platinum (Pt), palladium (Pd), rhodium (Rh), ruthenium (Ru), iridium (Ir), osmium (Os), rhenium (Re), and tantalum (Ta). When such a material is selected for the protective layer, the sticking of glass to the press-molding face can be prevented even when the die is used repeatedly under high temperatures and high pressures over a long period of time, and the deterioration of the surface properties due to surface roughening of the press-molding surface can be prevented.

A method for manufacturing a press-molding die according to the present invention comprises: a step of forming at least one intermediate layer on a press-molding face side of a die base material with a smooth surface on the press-molding face side, a step of forming at least one protective layer on the intermediate layer, and a step of forming a rough surface region on at least one surface selected from the group consisting of a surface on the press-molding face side of the die base material, a surface of the intermediate layer, and a surface of the protective layer. With such a method for manufacturing a press-molding die, a smooth surface region and a rough surface region can be formed on a press-molding face of a press-molding die. Thus, a plurality of regions with differing surface roughness can be formed on a magnetic-disk substrate molded using such a press-molding die. Moreover, the bond strength of the protective layer can be increased by forming the protective layer on an intermediate layer.

It is preferable that at least one process selected from the group consisting of a wet process and a dry process is used for the formation of the intermediate layer and the protective layer.

It is also preferable that the wet process is a plating process, and the dry process is at least one process selected from the group consisting of vapor deposition, sputtering, and ion-plating.

It is also preferable that the plating process is an electroless plating process.

It is preferable that the formation of the rough surface region is performed by forming a mask with an aperture corresponding to the rough surface region on a layer where the rough surface region is formed, and etching the aperture portion, and the mask is removed after forming the intermediate layer or the protective layer on the rough surface region.

It is preferable that at least one process selected from the group consisting of a solvent dipping process and an oxide plasma process is used for the removal of the mask.

It is preferable that the at least one protective layer comprises a first protective layer and a second protective layer, the intermediate layer is formed on the surface of the press-molding face side of the die base material, the first protective layer is formed on the intermediate layer, the rough surface region is formed on a surface of the first protective layer, and the second protective layer is formed on the rough surface region. With such a method for manufacturing a press-molding die, the surface roughness of the rough surface region on the first protective layer is reflected by the surface roughness of the second protective layer formed thereon. Thus, a rough surface region can be formed in the outermost surface of the protective layers, which comprise the press-molding face.

It is preferable that the at least one protective layer comprises a first protective layer and a second protective layer, the intermediate layer is formed on the surface of the press-molding face side of the die base material, the rough surface region is formed on a surface of the intermediate layer, the first protective layer is formed on the rough surface region, and the second protective layer is formed on the intermediate layer and the first protective layer. With such a method for manufacturing a press-molding die, the surface roughness of the rough surface region on the intermediate layer is reflected by the surface roughness of the protective layer formed thereon. Thus, a rough surface region can be formed in the outermost surface of the protective layer, which comprises the press-molding face.

It is preferable that the at least one intermediate layer comprises a first intermediate layer and a second intermediate layer, the first intermediate layer is formed on the surface of the press-molding face side of the die base material, the rough surface region is formed on a surface of the first intermediate layer, and the second intermediate layer is formed on the rough surface region, the protective layer is formed on the first intermediate layer and the second intermediate layer. With such a method for manufacturing a press-molding die, the surface roughness of the rough surface region on the first intermediate layer is reflected by the surface roughness of the second intermediate layer and the protective layer formed thereon. Thus, a rough surface region can be formed in the outermost surface of the protective layer, which comprises the press-molding face.

It is preferable that the at least one intermediate layer comprises a first intermediate layer and a second intermediate layer, a portion of the surface of the press-molding face side of the die base material is etched to a predetermined depth, the first intermediate layer is formed on the etched region, the rough surface region is formed on the first intermediate layer, the second intermediate layer is formed on the first intermediate layer and on the surface of the press-molding face side of the die base material, and the protective layer is formed on the second intermediate layer. With such a method for manufacturing a press-molding die, a rough surface region can be formed on the surface of the press-molding face side of the die base material, even when a rough surface region cannot be formed directly on the die base material.

A magnetic-disk glass substrate according to the present invention is manufactured by press-molding with a press-molding die having a plurality of regions with differing surface roughness on a press-molding face. With such a magnetic-disk glass substrate, a plurality of regions with differing surface roughness can be formed on such a magnetic-disk substrate. Thus, improved CSS properties and a lower flying height can be attained.

It is preferable that the plurality of regions with differing surface roughness of the press-molding die comprises an outer region comprising a peripheral portion of the press-molding face and an inner region comprising a central portion of the press-molding face within the outer region. Two types of regions with differing surface roughness can be formed on such a magnetic-disk glass substrate. Thus, one of those can be used as a CSS zone for taking off and landing the magnetic head on the magnetic disk, and the other one can be used as a data zone. It is preferable that the press-molding face of the press-molding die has a smooth surface region with a center line average roughness (Ra) of less than 2 nm and a rough surface region with a center line average roughness (Ra) of 2 to 50 nm. A smooth surface region and a rough surface region can be formed on such a magnetic-disk glass substrate. Thus, the rough surface region can be used as a CSS zone for taking off and landing the magnetic head from the magnetic substrate, and the smooth surface region can be used as a data zone.

It is preferable that an intermediate layer is formed between at least one protective layer and the press-molding face side of the die base material of the press-molding die, the outermost surface is a protective layer surface, and the protective layer surface of the outermost surface is the press-molding face.

It is preferable that a surface on the press-molding face side of the die base material of the press-molding die is a smooth surface, and a rough surface region is formed on a surface of the intermediate layer.

It is preferable that a rough surface region is formed on a surface of the press-molding face side of the die base material for the press-molding die.

DESCRIPTION OF THE PREFERRED EMBODIMENTS

The invention will be better understood from the following detailed description when considered with reference to the accompanying drawings.

First Embodiment

Figure 1:
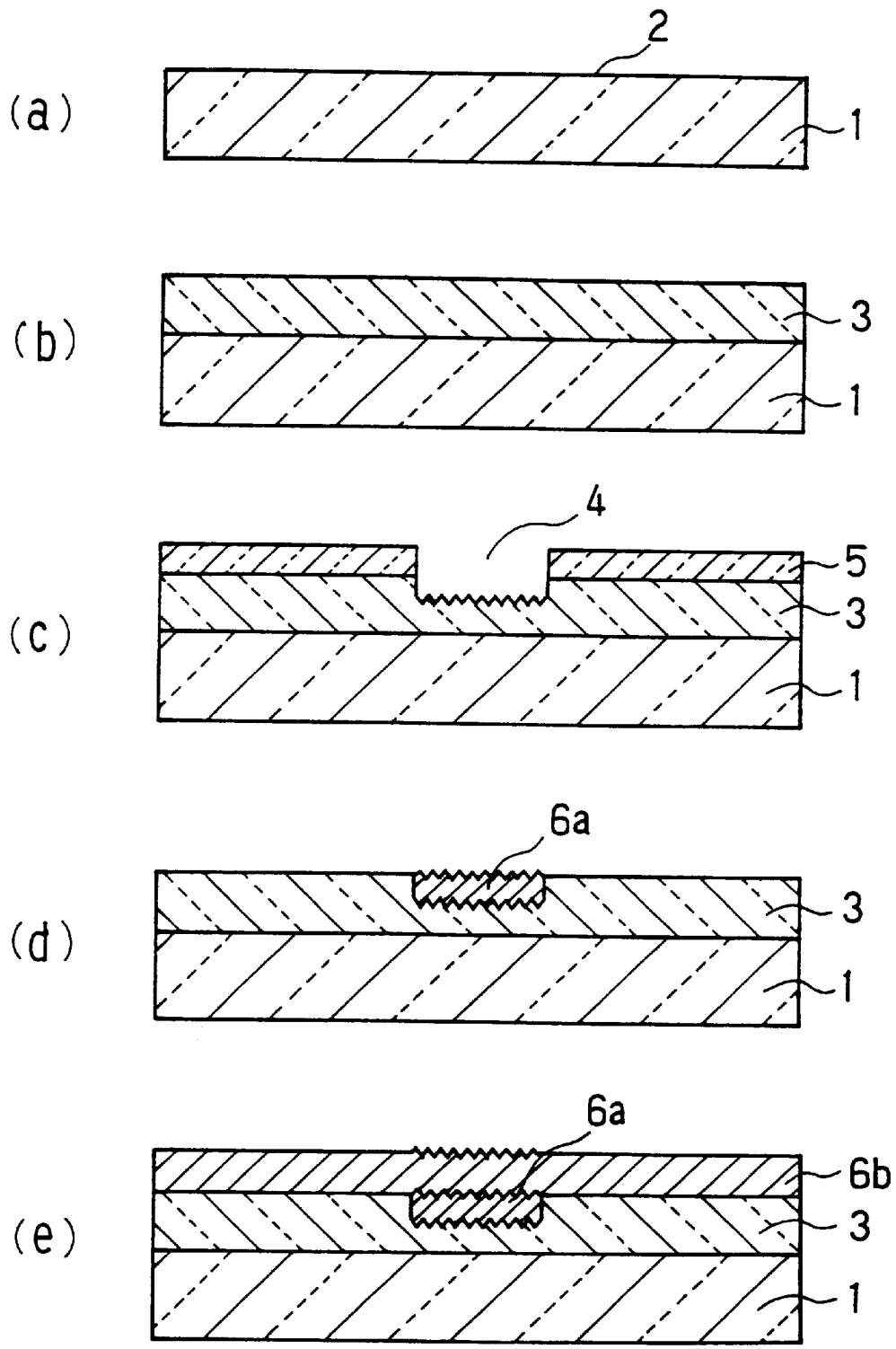
FIGS. 1(a)–(e) are cross-sections illustrating the manufacturing process for a press-molding die according to a first embodiment of the present invention.

FIG. 1 is a cross-section illustrating the manufacturing steps for a press-molding die for a magnetic-disk glass substrate according to the present invention.

FIG. 1(a) shows a die base material 1. To prevent deformation due to repeated use of the glass material used for the die base material 1, it is preferable to use a material with excellent mechanical strength at high temperatures and a low coefficient of thermal expansion. For example, quartz glass has a high transition temperature, and thus is suitable for the die base material 1.

It is also possible to use silicon dioxide as the main component for the die base material 1, and include components such as aluminum oxide, magnesium oxide, zinc oxide, alkali metal oxides, or alkaline earth metal oxides, according to necessity. In this case, the transition temperature of the die base material 1 has to be higher than the molding temperature of the glass element to be press-molded. To be specific, the transition temperature of the die base material 1 should be more than 50° C. higher than the molding temperature.

It is preferable that a surface 2 on the press-molding face has a center line average roughness (Ra) of less than 2 nm when used for magnetic disks. Such a smooth surface can be attained by polishing with silicon carbide, alumina, or diamond particles and subsequent precision-polishing with ceric oxide particles.

Single crystal alumina also can be used for the die base material 1. Single crystal alumina has a heat resistivity of more than 2000° C. A surface with less than 2 nm surface roughness, as is necessary for magnetic disks, can be attained by precision-polishing with globular $SiO_2$ particles, after lapping the surface with diamond grit, as in the case of glass.

As is shown in FIG. 1(b), an intermediate layer 3 is formed on the smooth surface 2 on the press-molding face of the die base material 1. The intermediate layer 3 is a thin film that comprises at least one material selected from the group consisting of silicon carbide, silicon nitride, and silicon oxide, and a component comprised in a noble metal alloy thin film formed thereon.

The intermediate layer 3 also can be a thin film comprising at least one metal selected from the group consisting of titanium (Ti), vanadium (V), chrome (Cr), zirconium (Zr), niobium (Nb), molybdenum (Mo), hafnium (Hf), tantalum (Ta) and tungsten (W).

Forming the intermediate layer 3 raises the bond strength with the protective layer consisting of a noble metal alloy thin film formed thereon. Therefore, even when press-molding is repeated at high temperature and high pressure, exfoliation of the protective film can be prevented. Moreover, the surface properties can be controlled by the etching mixture.

The intermediate layer 3 can be formed by sputtering a target of corresponding material. DC sputtering, high-frequency sputtering, magnetron sputtering and ion beam sputtering can be employed as sputtering methods. Preferable film forming conditions are a gas pressure of $1 \times 10^{-2}$ to $1 \times 10^{-4}$ Torr and a power density of 1 to 10 W/cm$^2$.

The formation of the intermediate layer is not limited to sputtering, but also can be performed with another dry process or a wet process. For example, vapor deposition or ion plating can be used for a dry process, and plating, especially electroless plating can be used for a wet process. The formation processes for the intermediate layer 3 as explained above are similar for the protective layer explained below.

It is preferable that the film thickness of the intermediate layer 3 is 0.1 to 5 µm. When the film thickness is less than 0.1 µm, then the effect of raising the bond strength becomes insufficient. When the film thickness is larger than 5 µm, the surface easily can become rough, so that the smoothness of the die surface is damaged. Moreover, when the die base material surface is sputtered with an inert gas, such as argon, to clean its surface before forming the intermediate layer, the bond strength can be increased.

The formation of the rough surface region is explained with reference to FIG. 1(c). It is preferable that the center line average roughness (Ra) of the rough surface region is 2 to 50 nm. In this region, the effect of reducing the friction between the magnetic head and the magnetic disk is significant. When it is lower than 2 nm, the magnetic head adheres easily to the magnetic disk. When it is larger than 50 nm, the flying height of the magnetic head is not steady and the signal noise becomes large.

A mask 5 having an aperture 4 corresponding to the rough surface region is formed on the surface of the intermediate layer 3, for example by photolithography. Dry-etching of the intermediate surface is performed by sputtering with an inert gas, such as argon. A thin film of the intermediate layer 3 is removed in a predetermined region, so that its surface can be roughened. The dry-etching and the subsequent formation of a protective layer 6a are performed in continuation, which raises the efficiency and the bond strength of the protective layer 6a.

Next, the protective layer 6a is formed, as illustrated in FIG. 1(d). The protective layer 6a is formed by sputtering, like the intermediate layer 3. The protective layer 6a has a rough surface, because of the surface of the intermediate layer 3 below. It is preferable that the surfaces of the protective layer 6a and the intermediate layer 3 are on the same plane. When there is a large step difference between the surfaces, the flying of the magnetic head becomes unsteady in this step difference portion, so that output variations occur and a region where storage is not possible arises near the step difference, which reduces the storage capacity.

Next, the mask is removed and a protective layer 6b is formed on the surface of the protective layer 6a and the intermediate layer 3. For example, a solvent dipping process and an oxide plasma process can be used for the removal of the mask 5. The protective layers 6a and 6b are made of a noble metal alloy thin film and comprise at least one element selected from the group consisting of platinum (Pt), palladium (Pd), rhodium (Rh), ruthenium (Ru), iridium (Ir), osmium (Os), rhenium (Re) and tantalum (Ta). Thus, the adhesion of glass to the press-molding face can be prevented even when press-molding is repeated under high temperatures and high pressures, and the deterioration of the surface properties due to surface roughening when press-molding can be prevented.

The sputtering and the film forming conditions for forming the protective layers 6a and 6b are the same as for the intermediate layer. It is preferable that the film thickness is 0.1 µm to 5 µm, like the film thickness of the intermediate layer. When the film thickness is below this range, a sufficient bond strength cannot be attained. When the film thickness is above this range, the surface easily can become rough, as with the intermediate layer, so that the smoothness of the die surface is damaged.

The surface of the protective layer reflects the surface roughness of the buried surface. In the region of the protective layer 6b formed on the protective layer 6a, the surface becomes rougher than in the region of the intermediate layer 3, so that a rough surface region can be attained. In the region of the protective layer 6b formed on the intermediate layer 3 with high smoothness, a smooth surface region can be attained. Thus, a zone-textured press-molding die for magnetic disks can be obtained.

Before the protective layer 6b is formed, the bonding strength of the protective layer 6b can be improved by dry-etching the surface of the intermediate layer 3 with a high-frequency plasma, for example argon, as in the formation of the intermediate layer 3. However, the conditions have to be optimized, so that the dry-etching does not roughen the surface of the intermediate layer 3.

Second Embodiment

Figure 2:
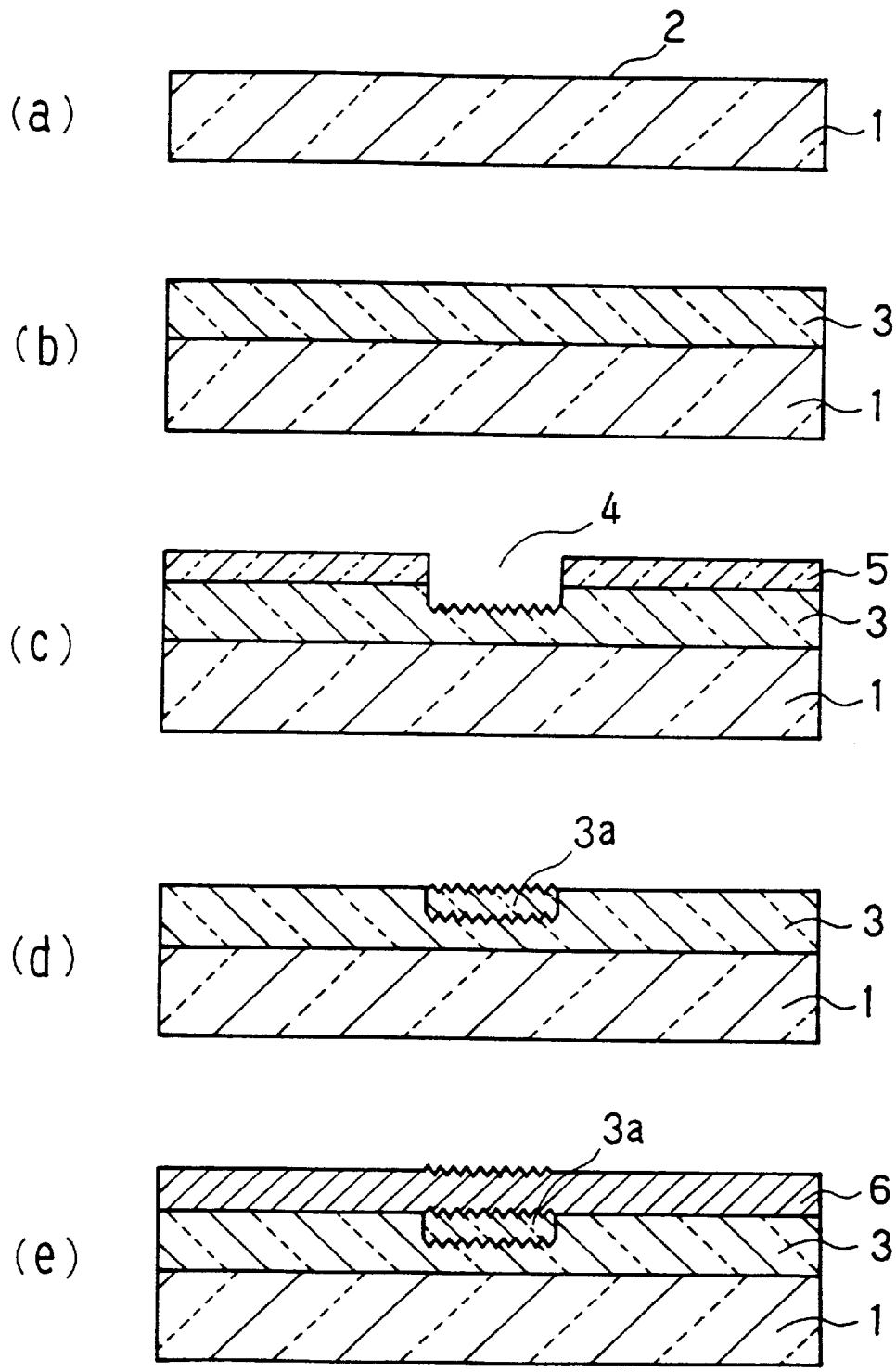
FIGS. 2(a)–(e) are cross-sections illustrating the manufacturing process for a press-molding die according to a second embodiment of the present invention.

FIG. 2 is a cross-section illustrating the manufacturing steps for a press-molding die according to a second embodiment. As is shown in FIG. 2(d), this embodiment differs from the first embodiment in that an intermediate layer 3a is formed instead of the protective layer 6a in the etched portion of the aperture 4.

Third Embodiment

Figure 3:
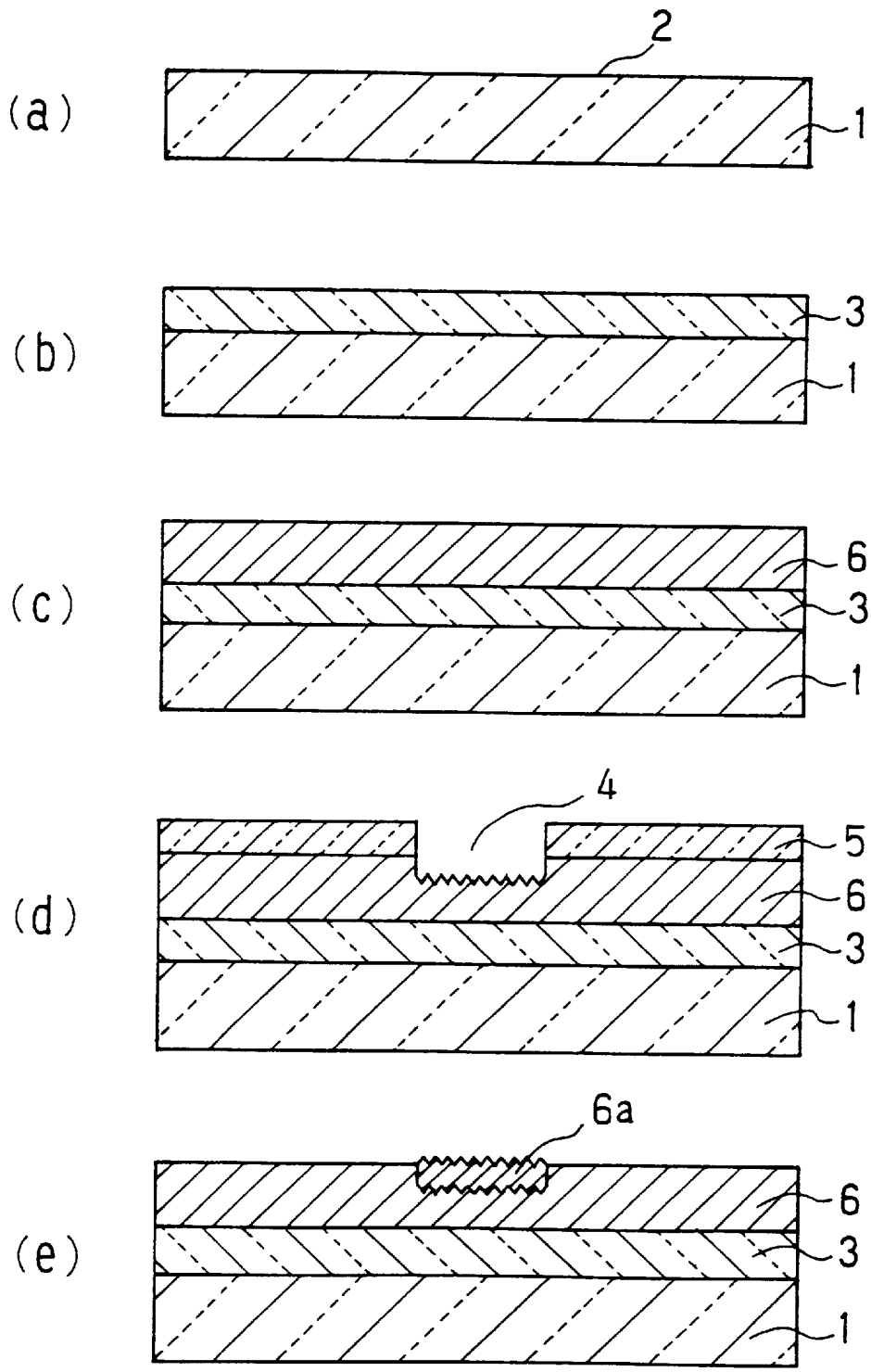
FIGS. 3(a)–(e) are cross-sections illustrating the manufacturing process for a press-molding die according to a third embodiment of the present invention.

FIG. 3 is a cross-section illustrating the manufacturing steps for a press-molding die according to a third embodiment. The following is an explanation, with reference to FIG. 3, of the aspects that are different from the first embodiment. As is illustrated in FIGS. 3(b) and (c), the protective layer 6 is formed after the intermediate layer 3 has been formed on the die base material 1. As is illustrated in FIG. 3(d), a mask having an aperture 4 corresponding to a rough surface region is arranged on the protective layer 6. The protective layer 6 is dry-etched by sputtering with an inert gas, such as argon. A thin film of the protective layer 6 can be removed at a predetermined region and the surface of this region can be roughened. Then, a protective layer 6a is formed, as illustrated in FIG. 3(e). The surface of the protective layer 6a is roughened according to the buried roughened surface of the protective layer 6.

Fourth Embodiment

Figure 4:
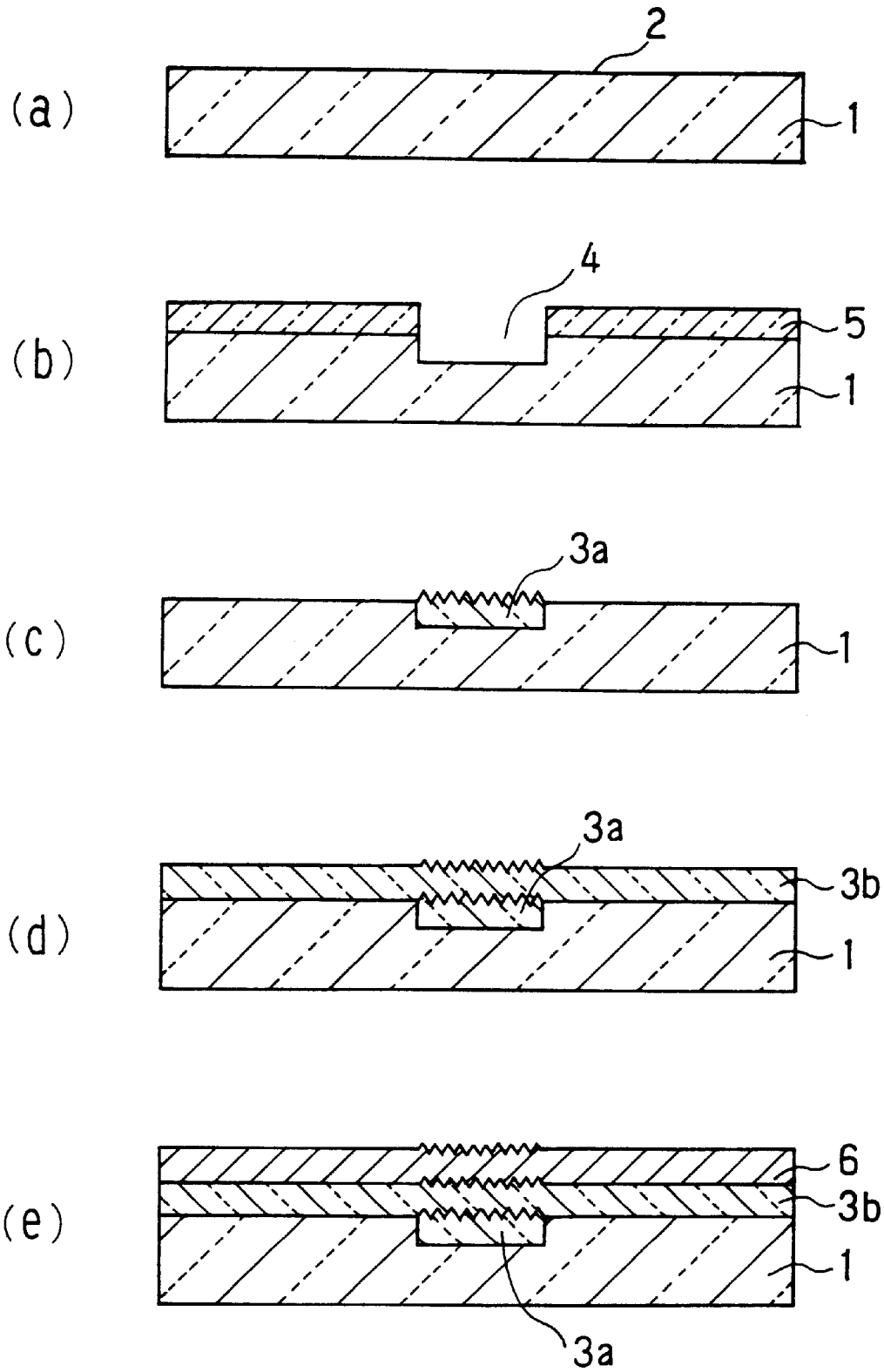
FIGS. 4(a)–(e) are cross-sections illustrating the manufacturing process for a press-molding die according to a fourth embodiment of the present invention.

FIG. 4 is a cross-section illustrating the manufacturing steps for a press-molding die according to a fourth embodiment. The following is an explanation, with reference to FIG. 4, of the aspects that are different from the first embodiment. As is illustrated in FIG. 4(b), a mask having an aperture 4 corresponding to a rough surface region is arranged on the die base material 1. The surface of the die base material is etched to a predetermined depth. The etching conditions are the same as for the intermediate layer in the first embodiment.

Then, as is illustrated in FIG. 4(c), an intermediate layer 3a is formed in the etched portion. The intermediate layer 3a is dry-etched to form a rough surface region, and the mask is removed. Then, an intermediate layer 3b is formed, as illustrated in FIG. 4(d). The surface of the intermediate layer 3b is roughened according to the surface of the buried intermediate layer 3a. Next, as illustrated in FIG. 4(e), a protective layer 6 is formed on the surface of the intermediate layer 3b. The surface of the protective layer 6 is roughened according to the surface of the buried intermediate layer 3b.

Fifth Embodiment

The following is an explanation of a manufacturing method for a magnetic-disk glass substrate by press-molding using a die of the above embodiments.

Figure 5:
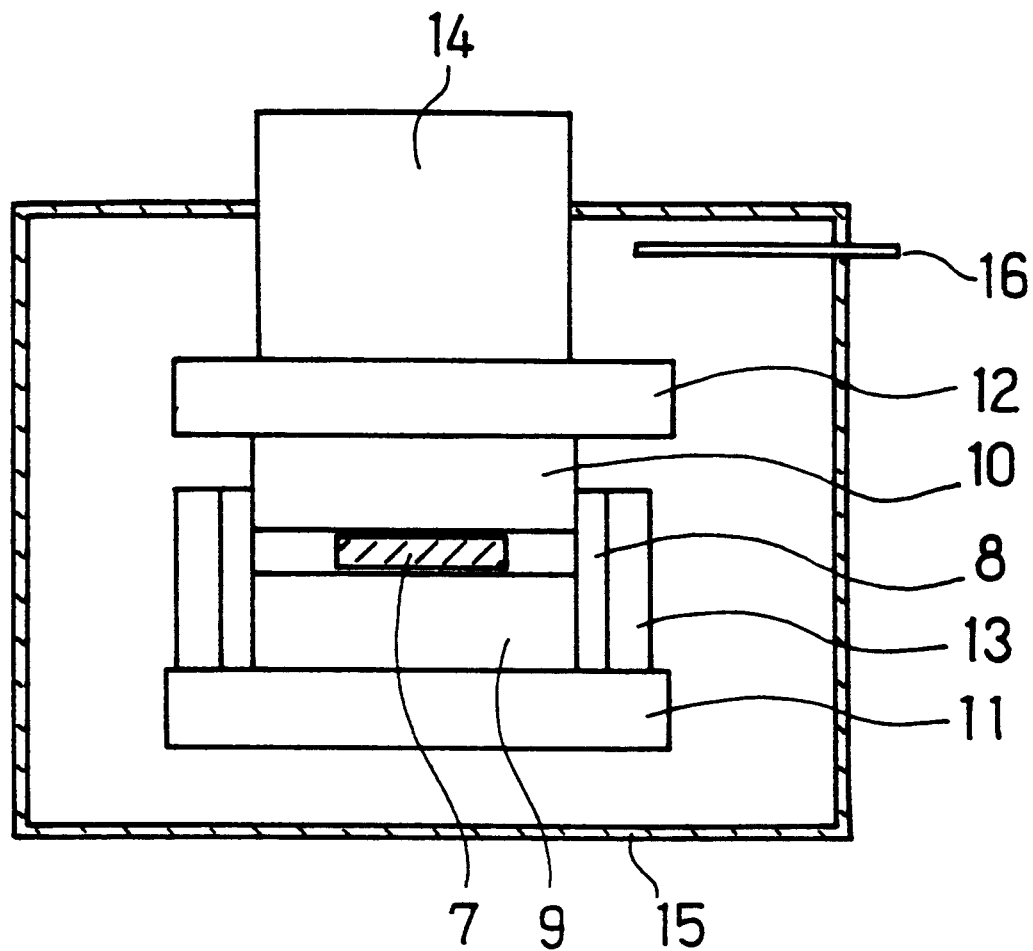
FIG. 5 is a schematic drawing of a press-molding apparatus using press-molding dies of the present invention.

FIG. 5 is a structural drawing of a press-molding apparatus using a die according to the present invention. A glass preform 7 is put onto a lower die 9 of the press-molding die. An upper die 8 is set through a shell die 8. The shell die 8 controls the outer diameter and the thickness of the disk and serves as a guide for the upper and the lower die to control their positions. A lower die heater 11, an upper die heater 12 and a lateral heater 13 heat the mold, which is compressed by a piston cylinder 14. These heaters heat the die uniformly up to a temperature near the softening point of the glass preform 7 to perform press-molding.

The entire press-molding apparatus is installed inside a chamber 15. Nitrogen gas is introduced from a nitrogen gas inlet 16, so that the press-molding can be performed in an atmosphere with low oxygen concentration. This prevents a decrease of the durability due to oxidation of the die when molding at high temperatures.

After the molding, a first cooling step is performed to cool the glass preform slowly to its glass transition point. Then, the pressure is reduced, and a second cooling step is performed. The first cooling step prevents inner distortions of the formed glass substrate due to non-uniform die temperatures. These distortions have an influence on the flatness of the formed glass substrate. They cause warping and, in extreme cases, cracks in the substrate.

EXAMPLES

The following examples describe a press-molding die for a magnetic-disk glass substrate for zone-texturing and a magnetic-disk glass substrate according to the present invention.

Example 1

The press-molding die according to Example 1 is produced according to the manufacturing steps illustrated in FIG. 1: A rough surface portion is formed on an the surface of an intermediate layer. Two cylindrical quartz glasses (for the upper and the lower die) of 48 mm diameter and 30 mm thickness were prepared as base materials 1 for the press-molding die. A press-molding surface 2 was mirror-polished with fine diamond grit of 0.1 $\mu$m particle size. Then, it was polished to a center line average roughness (Ra) of 0.5 nm with cerium oxide (same as in the examples 2 to 4 below).

Next, the polished surface was cleaned with a high-frequency argon gas plasma of 100 W power in a $3\times10^{-4}$ Torr vacuum. Then, using a target of iridium (Ir) arranged on silicon carbonate (SiC), an intermediate layer 3 of 1.0 $\mu$m thickness was formed (FIG. 1(b)) by high-frequency magnetron sputtering of 600 W power in a $5\times10^{-4}$ Torr vacuum.

Next, a mask having a circular aperture 4 of 18 mm diameter in a central portion was arranged on the intermediate layer 3. The surface of the intermediate layer was etched with a high-frequency argon gas plasma with 500 W power in a $3\times10^{-4}$ Torr vacuum, and an intermediate layer 3a with a roughened surface was formed in the central portion (FIG. 1(c)).

Then, a protective layer 6a consisting of an Ir (50 atom %)—Rh (50 atom %) thin film was formed by high-frequency magnetron sputtering with an iridium (Ir)—rhodium (Rh) target of 600 W power in a $5\times10^{-4}$ Torr vacuum (FIG. 1(d)).

After removing the mask 5, a protective layer 6b of 1.0 $\mu$m thickness was formed, under the same conditions as the protective layer 6a, on the surface of the intermediate layer 3 and the protective layer 6a. Thus, a pair of press-molding dies (Sample 1) having a smooth surface region and a rough surface region was produced (FIG. 1(e)).

For comparison, a press-molding die (Sample 5) was produced with a super-hard alloy, which was mirror-polished on a press-molding face with fine diamond-grit of 0.1 $\mu$m diameter, on which a protective layer of 1.0 $\mu$m thickness consisting of a Ir (50 atom %)—Rh (50 atom %) thin film was formed by high-frequency magnetron sputtering on the entire press-molding face, as in the present example.

Then, the Samples 1 and 5 were set as upper and lower dies 9 an 10 in the press-molding apparatus illustrated in FIG. 5, and a soda-lime glass preform 7 with 35 mm diameter was press-formed to produce a magnetic-disk glass substrate.

The press-molding was performed in a nitrogen atmosphere with not more than 0.1% oxygen concentration at 730° C. temperature and a pressure of 200 kg/cm$^2$. After maintaining the pressure for two minutes, the temperature was lowered at a rate of 10° C./min to 420° C. while keeping up the pressure. Then, after quenching at a normal temperature, the press-formed glass substrate was retrieved, and a bore was made in a machining process to produce a magnetic-disk glass substrate. These press-molding conditions were the same for the examples 2 to 4 below.

Example 2

An Example 2 of the press-molding die was produced according to the manufacturing steps illustrated in FIG. 2. In this example, a roughened surface portion is formed on the surface of an intermediate layer.

A polished surface of a die base material 1 was cleaned with a high-frequency argon gas plasma of 100 W power in a $3\times10^{-4}$ Torr vacuum. Then, using a target of platinum (Pt) arranged on silicon dioxide (SiO$_2$), an intermediate layer 3 of 0.8 $\mu$m thickness was formed by high-frequency magnetron sputtering of 600 W power in a $5\times10^{-4}$ Torr vacuum (FIG. 2(b)).

Then, a mask having a circular aperture 4 of 18 mm diameter in a central portion was arranged on the intermediate layer 3. The surface of the intermediate layer was etched with a high-frequency argon gas plasma with 500 W power in a $3\times10^{-4}$ Torr vacuum, and the surface of the central portion of the intermediate layer 3 was roughened (FIG. 2(c)). Then, the intermediate layer 3a was formed by sputtering under the same conditions as intermediate layer 3 (FIG. 2(d)).

The mask was removed, and the surface of the intermediate layers 3 and 3a were cleaned with a high-frequency argon plasma of 100 W power in a $3\times10^{-4}$ Torr vacuum. Next, a protective layer 4 of 1.3 $\mu$m thickness consisting of a Pt (50 atom %)—W (50 atom %) was formed by high-frequency magnetron sputtering with a platinum (Pt)—tungsten (W) target of 600 W power in a 5×10⁻⁴ Torr vacuum. Thus, a pair of press-molding dies (Sample 2) having a smooth surface region and a rough surface region was produced (FIG. 2(e)).

Then, a magnetic-disk glass substrate was produced using the molds of Sample 2 under the same conditions as in Example 1.

Example 3

An Example 3 of the press-molding die was produced according to the manufacturing steps illustrated in FIG. 3. In this example, a roughened surface portion is formed on a protective layer.

A polished surface of a die base material 1 was cleaned with a high-frequency argon gas plasma of 100 W power in a 3×10⁻⁴ Torr vacuum. Then, using a target of osmium (Os) arranged on silicon nitride (Si₃N₄), an intermediate layer 3 of 0.5 μm thickness was formed on the die base material 1 by high-frequency magnetron sputtering of 600 W power in a 5×10⁻⁴ Torr vacuum (FIG. 3(b)).

Then, a protective layer 6 of 2.0 μm thickness consisting of a Os (50 atom %)—Pd (50 atom %) thin film was formed by high-frequency magnetron sputtering with a osmium (Os)—palladium (Pd) target of 600 W power in a 5×10⁻⁴ Torr vacuum (FIG. 3(c)).

Then, a mask having a circular aperture 4 of 18 mm diameter in a central portion was arranged on the protective layer 6. The surface of the protective layer was etched with a high-frequency argon gas plasma with 500 W power in a 3×10⁻⁴ Torr vacuum, and the surface of the central portion of the protective layer 6 was roughened (FIG. 3(d)). After forming the protective layer 6, a protective layer 6a of 1.3 μm thickness was formed under the same conditions as the protective layer 6. Thus, a pair of press-molding dies (Sample 3) having a smooth surface region and a rough surface region was produced (FIG. 3(e)).

Then, a magnetic-disk glass substrate was produced using the molds of Sample 3 under the same conditions as in Example 1.

Example 4

An Example 4 of the press-molding die was produced according to the manufacturing steps illustrated in FIG. 4. In this example, a roughened surface portion is formed on the surface of a die base material.

A mask having a circular aperture 4 of 18 mm diameter in a central portion was arranged on the die base material 1. A polished surface of the die base material was etched with a high-frequency mixed gas plasma of CF₄ and oxygen with 300 W power in a 3×10⁻⁴ Torr vacuum (FIG. 4(b)). Then, using a target of tantalum (Ta) arranged on silicon carbonate (SiC), an intermediate layer 3a was formed by high-frequency magnetron sputtering of 600 W power in a 5×10⁻⁴ Torr vacuum. The surface of the intermediate layer 3a was etched by high-frequency plasma etching with argon gas with 500 W power in a 3×10⁻⁴ Torr vacuum to roughen the surface of the intermediate layer 3a (FIG. 4(c)).

Then, an intermediate layer 3b of 1.2 μm thickness was formed under the same conditions as the intermediate layer 3a. Then, a protective layer 6 of 1.1 μm thickness consisting of a Ta (50 atom %)—Pd (50 atom %) thin film was formed by high-frequency magnetron sputtering with a tantalum (Ta)—palladium (Pd) target of 600 W power in a 5×10⁻⁴ Torr vacuum (FIG. 4(e)). Thus, a pair of press-molding dies (Sample 4) having a smooth surface region and a rough surface region was produced.

For comparison, a die (Sample 6) was produced without the intermediate layer by forming a protective layer of 1.0 μm thickness consisting of a Ta (50 atom %)—Pd (50 atom %) thin film, as in the present example, on a die base material by high-frequency magnetron sputtering. Thus, a die (Sample 6) having a smooth surface region and a rough surface region was produced.

Then, under the same conditions as in Example 1, magnetic-disk glass substrates were produced using the molds of Samples 4 and 6.

Press-molding processes were performed 3000 times for each of the press-molding dies of the Examples 1 to 4. The smooth surface regions and the rough surface regions of the molds and the formed magnetic-disk glass substrates were measured in the beginning and after performing the 3000 press-molding processes at five locations in 50 μm squares using an atomic force microscope (AFM). The average surface roughness (SRa) was calculated and evaluated. Using a 3-D surface roughness meter based on optical interference, the number of coarse protrusions (dents in the case of molds) of at least 50 nm height was measured. Table 1 shows the results of this measurement.

TABLE 1

| Sample | Measured Portion | Surface Roughness (Mold) (nm) | | Surface Roughness (Formed Substrate) (nm) | | Number of Protrustions/mm² (Formed Substrate) | |
|---|---|---|---|---|---|---|---|
| | | Initially | After 3000 Form. | Initially | After 3000 Form. | Initially | After 3000 Form. |
| Examples | | | | | | | |
| 1 | Smooth Region | 0.9 | 1.2 | 0.8 | 1.0 | 0 | 0 |
| | Rough Region | 20.0 | 23.0 | 19.0 | 21.0 | — | — |
| 2 | Smooth Region | 1.0 | 1.3 | 0.9 | 1.0 | 0 | 0 |
| | Rough Region | 10.0 | 11.0 | 10.0 | 11.0 | — | — |

TABLE 1-continued

| Sample | Measured Portion | Surface Roughness (Mold) (nm) | | Surface Roughness (Formed Substrate) (nm) | | Number of Protrustions/mm² (Formed Substrate) | |
|---|---|---|---|---|---|---|---|
| | | Initially | After 3000 Form. | Initially | After 3000 Form. | Initially | After 3000 Form. |
| 3 | Smooth Region | 1.3 | 1.5 | 1.3 | 1.4 | 0 | 0 |
| | Rough Region | 30.0 | 35.0 | 28.0 | 33.0 | — | — |
| 4 | Smooth Region | 1.5 | 1.8 | 1.4 | 1.7 | 0 | 0 |
| | Rough Region | 30.0 | 33.0 | 28.0 | 32.0 | — | — |
| Comparative Examples | | | | | | | |
| 5 | Smooth Region | 15.0 | — | 14.0 | — | 6 | — |
| 6 | Smooth Region | 0.8 | — | 0.8 | — | 0 | — |
| | Rough Region | 25.0 | — | 24.0 | — | 0 | — |

As can be seen in Table 1, the change of the surface roughness of the magnetic-disk substrates produced with the press-molding dies of the examples (Samples 1 to 4) from the initial product to the products produced after 3000 press-molding processes was small, and the formation of coarse protrusions could not be observed.

In the comparative example using a super-hard alloy (Sample 5) on the other hand, the surface roughness was big, and protrusions of more than 50 nm could be observed from the beginning. Also, when the die surface was observed with an optical microscope at ×800 magnification, portions with small defects could be observed.

In the comparative example without an intermediate layer (Sample 6), there were no difficulties at the beginning, but after a number of press-molding processes, the protective film started to peel off, so that further use became impossible.

In the Examples 1 to 4, the materials for the intermediate layers and the protective layers are not limited to the materials of the examples, but the same effects can be attained, if the intermediate layers are thin films comprising at least one material selected from the group consisting of silicon carbonate, silicon nitride, and silicon dioxide, and a component included in the protective film formed thereon, and the protective films is an alloy thin film comprising at least one component selected from the group consisting of tungsten (W), platinum (Pt), palladium (Pd), rhodium (Rh), ruthenium (Ru), iridium (Ir), osmium (Os), rhenium (Re), and tantalum (Ta).

With the press-molding die according to the present invention as explained above, a plurality of regions with differing surface roughness are formed on a press-molding face, so that a plurality of regions with differing surface roughness can be formed on the magnetic-disk substrates formed therewith. Thus, magnetic-disk glass substrates can be manufactured that have improved CSS properties and allow lower flying height.

Moreover, the main component for the die base material is glass, and an intermediate layer is formed between the die base material and the protective layer. Thus, a deterioration of the die can be prevented, even if the die is used repeatedly over a long period of time, so that the lifetime of the expensive die can be extended, and zone-textured high-quality magnetic-disk glass substrates combining high density with high reliability can be provided at low cost in large quantities.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A press-molding die for a magnetic-disk glass substrate, having a press-molding face provided with a plurality of regions with differing surface roughness comprising:
    a die base material having a press-molding face side;
    at least one protective layer above the press-molding face side of the die base material; and
    at least one intermediate layer between the protective layer and the press-molding face side of the die base material,
    wherein a surface of the protective layer is an outermost surface of the press-molding die, said outermost surface of the press-molding die comprises said press-molding face, and a rough surface region is formed on a surface of the press-molding face side of said die base material.

2. The press-molding die according to claim 1, wherein said rough surface region is formed on a surface of a layer that is formed separately from said die base material.

3. The press-molding die according to claim 1, wherein said at least one intermediate layer comprises a first intermediate layer member and a second intermediate layer member,
    said rough surface region is formed on a surface of said first intermediate layer member formed on said die base material,
    said second intermediate layer member is formed on a surface of the press-molding face side of said first intermediate layer member and said die base material, and said at least one protective layer is formed on said second intermediate layer member.

4. The press-molding die according to claim 1, wherein the material for said die base is a glass material having silicon dioxide as a main component and comprising at least one material selected from the group consisting of aluminum oxide, magnesium oxide, zinc oxide, alkali metal oxide, and alkali earth metal oxide.

5. The press-molding die according to claim 4, wherein said glass material is quartz glass.

6. The press-molding die according to claim 1, wherein the material for said die base material is single-crystal alumina.

7. The press-molding die according to claim 1, wherein said intermediate layer comprises at least one material selected from the group consisting of silicon carbonate, silicon nitride, and silicon oxide, and a component included in said protective layer formed on said intermediate layer.

8. The press-molding die according to claim 1, wherein said intermediate layer comprises at least one metal material selected from the group consisting of titanium (Ti), vanadium (V), chrome (Cr), zirconium (Zr), niobium (Nb), molybdenum (Mo), hafnium (Hf), tantalum (Ta) and tungsten (W).

9. The press-molding die according to claim 1, wherein said protective layer comprises at least one metal material selected from the group consisting of tungsten (W), platinum (Pt), palladium (Pd), rhodium (Rh), ruthenium (Ru), iridium (Ir), osmium (Os), rhenium (Re), and tantalum (Ta).

10. The press-molding die according to claim 1, wherein said rough surface region is formed by dry-etching.

11. A press-molding die for a magnetic-disk glass substrate, having a press-molding face provided with a plurality of regions with differing surface roughness comprising:
    a die base material having a press-molding face side;
    at least one protective layer above the press-molding face side of the die base material; and
    at least one intermediate layer between the protective layer and the press-molding face side of the die base material,
    wherein a surface of the protective layer is an outermost surface of the press-molding die, and said outermost surface of the press-molding die comprises said press-molding face, a surface of the press-molding face side of said die base material is smooth, and a rough surface region is formed on a surface of said at least one intermediate layer.

12. The press-molding die according to claim 11, wherein said at least one protective layer comprises a first protective layer member and a second protective layer member,
    said first protective layer member is formed on said rough surface region, and
    said second protective layer member is formed on said intermediate layer, on which said rough surface region has been formed, and said first protective layer member.

13. The press-molding die according to claim 11, wherein said at least one intermediate layer comprises a first intermediate layer member and a second intermediate layer member,
    said first intermediate layer member is formed on the surface of the press-molding face side of said die base material,
    said rough surface region is formed on a surface of said first intermediate layer member,
    said second intermediate layer member is formed on said rough surface region, and
    said at least one protective layer is formed on said first intermediate layer member and said second intermediate layer member.

14. The press-molding die according to claim 11, wherein the material for said die base material is a glass material having silicon dioxide as a main component and comprising at least one material selected from the group consisting of aluminum oxide, magnesium oxide, zinc oxide, alkali metal oxide, and alkali earth metal oxide.

15. The press-molding die according to claim 14, wherein said glass material is quartz glass.

16. The press-molding die according to claim 11, wherein the material for said die base material is single-crystal alumina.

17. The press-molding die according to claim 11, wherein said intermediate layer comprises at least one material selected from the group consisting of silicon carbonate, silicon nitride, and silicon oxide, and a component included in said protective layer formed on said intermediate layer.

18. The press-molding die according to claim 11, wherein said intermediate layer comprises at least one metal material selected from the group consisting of titanium (Ti), vanadium (V), chrome (Cr), zirconium (Zr), niobium (Nb), molybdenum (Mo), hafnium (Hf), tantalum (Ta) and tungsten (W).

19. The press-molding die according to claim 11, wherein said protective layer comprises at least one metal material selected from the group consisting of tungsten (W), platinum (Pt), palladium (Pd), rhodium (Rh), ruthenium (Ru), iridium (Ir), osmium (Os), rhenium (Re), and tantalum (Ta).

20. A press-molding die for a magnetic-disk glass substrate, having a press-molding face provided with a plurality of regions with differing surface roughness comprising:
    a die base material having a press-molding face side;
    at least one protective layer above the press-molding face side of the die base material and comprising first and second protective layer members; and
    at least one intermediate layer between the protective layer and the press-molding face side of the die base material,
    wherein a surface of the protective layer is an outermost surface of the press-molding die, and said outermost surface of the press-molding die comprises said press-molding face, a surface of the press-molding face side of said die base material is smooth, said first protective layer member is formed on said intermediate layer, a rough surface region is formed on a surface of said first protective layer member, and a second protective layer member is formed on said rough surface region.

21. The press-molding die according to claim 20, wherein the material for said die base material is a glass material having silicon dioxide as a main component and comprising at least one material selected from the group consisting of aluminum oxide, magnesium oxide, zinc oxide, alkali metal oxide, and alkali earth metal oxide.

22. The press-molding die according to claim 21, wherein said glass material is quartz glass.

23. The press-molding die according to claim 20, wherein the material for said die base material is single-crystal alumina.

24. The press-molding die according to claim 20, wherein said intermediate layer comprises at least one material selected from the group consisting of silicon carbonate, silicon nitride, and silicon oxide, and a component included in said protective layer formed on said intermediate layer.

25. The press-molding die according to claim 20, wherein said intermediate layer comprises at least one metal material selected from the group consisting of titanium (Ti), vanadium (V), chrome (Cr), zirconium (Zr), niobium (Nb), molybdenum (Mo), hafnium (Hf), tantalum (Ta) and tungsten (W).

26. The press-molding die according to claim 20, wherein said protective layer comprises at least one metal material selected from the group consisting of tungsten (W), platinum (Pt), palladium (Pd), rhodium (Rh), ruthenium (Ru), iridium (Ir), osmium (Os), rhenium (Re), and tantalum (Ta).

27. The press-molding die according to claim 20, wherein said rough surface region is formed by dry etching.

28. The press-molding die according to claim 11, wherein said rough surface region is formed by dry-etching.

* * * * *